(12) United States Patent
Zukowski et al.

(10) Patent No.: US 9,922,090 B1
(45) Date of Patent: Mar. 20, 2018

(54) SYSTEM AND METHOD FOR AUTOMATIC VERTICAL DECOMPOSITION OF A TABLE FOR IMPROVING INPUT/OUTPUT AND MEMORY UTILIZATION IN A DATABASE

(75) Inventors: Marcin Zukowski, Amsterdam (NL); Hui Li, Eindhoven (NL)

(73) Assignee: ACTIAN NETHERLANDS, B.V., Amsterdam (NL)

( * ) Notice: Subject to any disclaimer, the term of this patent is extended or adjusted under 35 U.S.C. 154(b) by 4 days.

(21) Appl. No.: 13/431,890

(22) Filed: Mar. 27, 2012

(51) Int. Cl.
*G06F 17/30* (2006.01)

(52) U.S. Cl.
CPC .. *G06F 17/30501* (2013.01); *G06F 17/30315* (2013.01); *G06F 17/30339* (2013.01)

(58) Field of Classification Search
CPC ......... G06F 17/30501; G06F 17/30315; G06F 17/30339
USPC ....................................................... 707/693
See application file for complete search history.

(56) References Cited

U.S. PATENT DOCUMENTS

| | | | |
|---|---|---|---|
| 590,855 A | 9/1897 | Phelps, Jr. | |
| 5,680,557 A * | 10/1997 | Karamchetty | G06F 8/34 715/765 |
| 5,920,855 A | 7/1999 | Aggarwal et al. | |
| 6,292,186 B1 * | 9/2001 | Lehman et al. | 715/705 |
| 6,336,124 B1 * | 1/2002 | Alam et al. | 715/205 |
| 6,343,275 B1 | 1/2002 | Wong | |
| 6,463,582 B1 | 10/2002 | Lethin et al. | |
| 6,546,388 B1 | 4/2003 | Edlund et al. | |
| 7,089,362 B2 | 8/2006 | Creta et al. | |
| 7,404,182 B1 | 7/2008 | Garthwaite et al. | |
| 7,448,048 B1 | 11/2008 | Nesamoney et al. | |
| 7,685,580 B1 | 3/2010 | Detlefs et al. | |
| 7,730,079 B2 | 6/2010 | Meijer et al. | |
| 7,783,681 B1 | 8/2010 | Delsart | |
| 7,849,444 B2 | 12/2010 | Melamed et al. | |
| 8,001,021 B1 | 8/2011 | Quinn et al. | |
| 8,095,738 B2 | 1/2012 | Benhase et al. | |
| 8,150,850 B2 * | 4/2012 | Herrnstadt | 707/737 |
| 8,200,527 B1 | 6/2012 | Thompson et al. | |
| 8,260,803 B2 | 9/2012 | Hsu et al. | |
| 8,271,965 B2 | 9/2012 | Wang | |
| 8,364,519 B1 | 1/2013 | Basu et al. | |
| 8,386,845 B1 | 2/2013 | Gharpure et al. | |
| 8,417,789 B1 | 4/2013 | Gopalan et al. | |
| 8,423,981 B2 | 4/2013 | Hudson et al. | |
| 8,606,994 B2 | 12/2013 | Ledford | |
| 8,626,725 B2 | 1/2014 | Netz et al. | |

(Continued)

FOREIGN PATENT DOCUMENTS

EP 855656 A2 7/1998
EP 754325 B1 12/2000

OTHER PUBLICATIONS

Richard A. Hankins and Jignesh M. Patel, Data Morphing. An Adaptive, Cache-Conscious Storage Technique, Proceedings of the 29th VLDB Conference, Berlin, Germany, 2003, pp. 1-12.*

(Continued)

*Primary Examiner* — Joshua Bullock
(74) *Attorney, Agent, or Firm* — DLA Piper LLP (US)

(57) ABSTRACT

A system and method for improving input/output and memory utilization in a database are described. The system may implement an automatic vertical table decomposition process to achieve the improved input/output, storage and memory utilization in a database.

32 Claims, 8 Drawing Sheets

(56) References Cited

U.S. PATENT DOCUMENTS

| | | |
|---|---|---|
| 8,767,957 B1 | 7/2014 | Bagchi et al. |
| 8,825,959 B1 | 9/2014 | Switakowki et al. |
| 9,110,946 B2 | 8/2015 | Chen et al. |
| 2002/0083049 A1 | 6/2002 | Forster et al. |
| 2002/0165848 A1 | 11/2002 | Rautenbach et al. |
| 2003/0005134 A1 | 1/2003 | Martin et al. |
| 2003/0120654 A1 | 6/2003 | Edlund et al. |
| 2003/0220931 A1 | 11/2003 | Sexton et al. |
| 2005/0084152 A1 | 4/2005 | McPeake et al. |
| 2005/0167917 A1 | 8/2005 | MacIver et al. |
| 2005/0209988 A1 | 9/2005 | Cunningham et al. |
| 2005/0216421 A1 | 9/2005 | Barry et al. |
| 2006/0167917 A1 | 7/2006 | Solomon |
| 2006/0200741 A1 | 9/2006 | DeMesa et al. |
| 2006/0212244 A1 | 9/2006 | Levine et al. |
| 2006/0224542 A1 | 10/2006 | Yalamanchi |
| 2006/0293934 A1 | 12/2006 | Tsyganskiy et al. |
| 2007/0067573 A1 | 3/2007 | Bruening et al. |
| 2007/0240136 A1 | 10/2007 | Garyali et al. |
| 2008/0059492 A1 | 3/2008 | Tarin |
| 2008/0066145 A1 | 3/2008 | Molen et al. |
| 2008/0120469 A1 | 5/2008 | Kornegay et al. |
| 2008/0243969 A1 | 10/2008 | Wintergerst et al. |
| 2008/0244471 A1 | 10/2008 | Killian et al. |
| 2009/0007116 A1 | 1/2009 | Duffy et al. |
| 2009/0249446 A1 | 10/2009 | Jenkins et al. |
| 2009/0254572 A1 | 10/2009 | Redlich et al. |
| 2009/0300631 A1 | 12/2009 | Karlapalem et al. |
| 2010/0114915 A1 | 5/2010 | Gorton, Jr. |
| 2010/0235335 A1 | 9/2010 | Heman et al. |
| 2010/0250497 A1 | 9/2010 | Redlich et al. |
| 2010/0268773 A1* | 10/2010 | Hunt et al. .................. 709/203 |
| 2011/0078243 A1 | 3/2011 | Carpenter et al. |
| 2011/0093500 A1 | 4/2011 | Meyer et al. |
| 2011/0208822 A1 | 8/2011 | Rathod |
| 2011/0225232 A1 | 9/2011 | Casalaina et al. |
| 2011/0270711 A1 | 11/2011 | Kusterer |
| 2013/0173669 A1* | 7/2013 | Tang ................. G06F 17/30292 707/803 |
| 2013/0179395 A1 | 7/2013 | Heman et al. |

OTHER PUBLICATIONS

Martin Grund, et al., HYRISE—A Main Memory Hybrid Storage Engine, VLDB '10, Sep. 1317, 2010, Singapore, ~ht 2010 VLDB Endowment, ACM 000-0-00000-000-0/00/00, pp. 1-12.*
Martin Grund, et al., HYRISE—A Main Memory Hybrid Storage Engine, VLDB '10, Sep. 1317, 2010, Singapore, Copyright 2010 VLDB Endowment, ACM 000-0-00000-000-0/00/00, pp. 1-12.
The Vertica® Analytic Database Technical Overview White Paper, A DBMS Arhitecture Optimized for Next-Generation Data Warehousing, Mar. 2010, pp. 1-13.
Richard A. Hankins and Jignesh M. Patel, *Data Morphing: An Adaptive, Cache-Conscious Storage Technique*, Proceedings of the 29th VLDB Conference, Berlin, Germany, 2003, pp. 1-12.
Anastassia Ailamaki, et al., *Weaving Relations for Cache Performance*, Proceedings of the 27th VLDB Conference, Rome, Italy, 2001, pp. 1-12.
Martin Grund, et al., *HYRISE—A Main Memory Hybrid Storage Engine*, VLDB '10, Sep. 13-17, 2010, Singapore, Copyright 2010 VLDB Endowment, ACM 000-0-00000-000-0/00/00, pp. 1-12.
The Vertica® Analytic Database Technical Overview White Paper, A DBMS Architecture Optimized for Next-Generation Data Warehousing, Mar. 2010, pp. 1-13.
Vertica Database Data Sheet, Mar. 2010, pp. 1-3.
C. A. Lang, B. Bhattacharjee, T. Malkemus, S. Padmanabhan, and K. Wong. Increasing buffer-locality for multiple relational table scans through grouping and throttling. In ICDE, Istanbul, Turkey, 2007 (10 pgs.).
Marcin Zukowski, Sandor Heman, Niels Nes, Peter Boncz. *Cooperative Scans: Dynamic Bandwidth Sharing in a DBMS. VLDB 2007*, Vienna, Austria, Sep. 2007 (12 pgs.).
Alicja Luszczak, *Simple Solutions for Compressed Execution in Vectorized Database System*. MSc thesis, University of Warsaw, 2011 (70 pgs.).
Daniel J. Abadi, Samuel Madden, and Miguel Ferreira. Integrating compression and execution in column-oriented database systems. In *Proceedings of the 2006 ACM SIGMOD international conference on Management of data*, 2006, pp. 671-682 (12 pgs.).
Alfons Kemper, Thomas Neumann, HyPer: A hybrid OLTP&OLAP main memory database system based on virtual memory snapshots, ICDE, 2011 (12 pgs.).
K. Krikellas, S. Viglas, and M. Cintra. Generating code for holistic query evaluation, ICDE, pp. 613-624, 2010 (12 pgs.).
J. Sompolski, Just-in-time Compilation in Vectorized Query Execution, Master thesis (94 pgs.).
J. Sompolski, M. Żukowski, P. Boncz, Vectorization vs. Compilation in Query Execution, Proceedings of the Seventh International Workshop on Data Management on New Hardware, pp. 33-40 (8 pgs.).
J. Rao, H. Pirahesh, C. Mohan, G. M. Lohman, Compiled Query Execution Engine using JVM, ICDE, 2006 (12 pgs.).
M. Zukowski. Balancing Vectorized Query Execution with Bandwidth-Optimized Storage. Ph.D. Thesis, Universiteit van Amsterdam, Sep. 2009 (245 pgs.).
Bodgan Raducanu, Micro Adaptivity in a Vectorized Database System, Master Thesis in Parallel and Distributed Computer Systems, Universitatea Politehnica Bucuresti / Vrije Universiteit van Amsterdam, Aug. 2012 (62 pages).
A Critique of ANSI SQL Isolation Levels. By H. Bernenson, et al. In Proc. SIGMOD, 1995.
Monet: A Next-Generation DBMS Kernel for Query-Intensive Applications. By P. Boncz. Ph.D. Thesis, Universiteit van Amsterdam, May 2002.
Monet DB/X100: Hyper-Pipelining Query Execution. By P. Boncz, et al. In Proc. CIDR, 2005.
Serializable Isolation for Snapshot Databases. By M.J. Cahil, et al. In Proc. SIGMOD, 2008.
Update Conscious Bitmap Indices. By G. Canahuate, et al.. In Proc. SSDBM 2007.
Improving Index Performance through Prefetching. By S. Chen, P.B. Gibbons, et al. In Proc. SIGMOD, 2001.
Adjoined Dimension Column Clustering to Improve Data Warehouse Query Performance. By X. Chen, et al. In Proc. ICDE, 2008.
A Decomposition Storage Model. By A. Copeland, et al. In Proc. SIGMOD, 1985.
Sorting and Indexing with Partitioned B-Tress. By G. Graefe. In Proc. CIDR, 2003.
Efficient Columnar Storage in B-Trees. By G. Graefe. SIGMOD Record, 36(1), 2007.
Fast Loads and Fast Queries. By G. Graefe. In DaWaK, 2009.
The Transaction Concept: Virtues and Limitations. By J. Gray. In Proc. VLDB, pp. 144-154, 1981.
Incremental Organization for Data Recording and Warehousing. By H.V. Jagadish, et al. In Proc. VLDB, 1997.
A Light Weight Index Structure for Data Warehousing. By G. Moerkotte. In Proc. VLDB, 1998.
Aries: A Transaction Recovery Method Supporting Fine-Granularity Locking and Partial Rollbacks Using Write-Ahead Logging. By C. Mohan, et al. TODS, 17(1), 1992.
The Log-Structured Merge-Tree. By P. O'Neil, E. Cheng, D. Gawlick, et al. Acta Informatica, 33(4), 1996.
Multi-Dimensional Clustering: A New Data Layout Scheme in db2. By S. Padmanabhan, et al. In Proc. SIGMOD, 2003.
Block Oriented Processing of Relational Database Operations in Modern Computer Architectures. By S. Padmanabhan, et al. In Proc. ICDE, 2001.
A Case for Fractured Mirrors. By R. Ramamurthy, D.J. DeWitt, et al. The VLDB Journal, 12(2):89-101, 2003.
Differential Files: Their Application to the Maintenance of Large Databases. By D. Severance, et al. ACM Trans. Database Syst., 1(3), 1976.
Data Warehouse Technology by InfoBright. By D. Slezak, et al. In Proc. SIGMOD, 2009.

(56) References Cited

OTHER PUBLICATIONS

C-Store: A Column-Oriented DVMS. By M. Stonebracker et al. In Proc. VLDB, 2005.
Counted B-Trees. By S. Tatham. In www.chiark.greenend.org.uk/sgtatham/algorithms/cbtree/html, 2001.

* cited by examiner

| Val1.1 | Val2.1 | Val3.1 | Val4.1 | Val5.1 | Val6.1 |
| Val1.2 | Val2.2 | Val3.2 | Val4.2 | Val5.2 | Val6.2 |
| Val1.3 | Val2.3 | Val3.3 | Val4.3 | Val5.3 | Val6.3 |
| Val1.4 | Val2.4 | Val3.4 | Val4.4 | Val5.4 | Val6.4 |
| Val1.5 | Val2.5 | Val3.5 | Val4.5 | Val5.5 | Val6.5 |
| Val1.6 | Val2.6 | Val3.6 | Val4.6 | Val5.6 | Val6.6 |
| Val1.7 | Val2.7 | Val3.7 | Val4.7 | Val5.7 | Val6.7 |
| Val1.8 | Val2.8 | Val3.8 | Val4.8 | Val5.8 | Val6.8 |

FIGURE 3

| Val1.1 | Val2.1 | Val3.1 | Val4.1 | Val5.1 | Val6.1 |
| Val1.2 | Val2.2 | Val3.2 | Val4.2 | Val5.2 | Val6.2 |
| Val1.3 | Val2.3 | Val3.3 | Val4.3 | Val5.3 | Val6.3 |
| Val1.4 | Val2.4 | Val3.4 | Val4.4 | Val5.4 | Val6.4 |
| Val1.5 | Val2.5 | Val3.5 | Val4.5 | Val5.5 | Val6.5 |
| Val1.6 | Val2.6 | Val3.6 | Val4.6 | Val5.6 | Val6.6 |
| Val1.7 | Val2.7 | Val3.7 | Val4.7 | Val5.7 | Val6.7 |
| Val1.8 | Val2.8 | Val3.8 | Val4.8 | Val5.8 | Val6.8 |

SYSTEM AND METHOD FOR AUTOMATIC VERTICAL DECOMPOSITION OF A TABLE FOR IMPROVING INPUT/OUTPUT AND MEMORY UTILIZATION IN A DATABASE

APPENDIX

Appendix A (3 pages) are a listing of pseudocode for an implementation of the method for automatic vertical decomposition of a table.

Appendix A forms part of the specification and is incorporated herein by reference.

FIELD

The disclosure relates generally to a database system and in particular to a system and method for improving input/output and memory utilization in a database.

BACKGROUND

Figure 1:
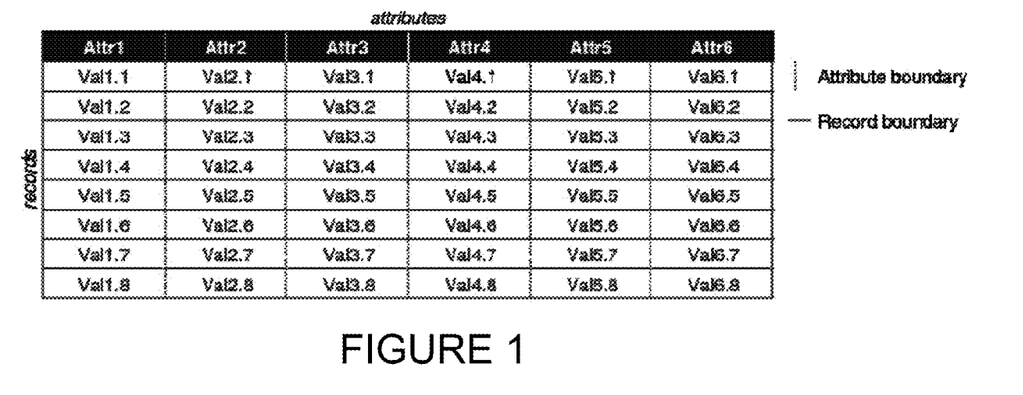
FIG. 1 is an example of a typical logical table view.

There are many different types of database systems that store the data in different ways. Generally, the database systems have a logical table view such as shown in FIG. 1 in which one or more records is each a row of the table. The one or more attributes of the database (and hence the one or more attributes of each record) each is a column of the table. Each record (row) has a set of attributes associated with the record (such as Val1.1, Val2.1, Val3.1, Val4.1, Val5.1 and Val6.1 for the first record.

Figure 2:
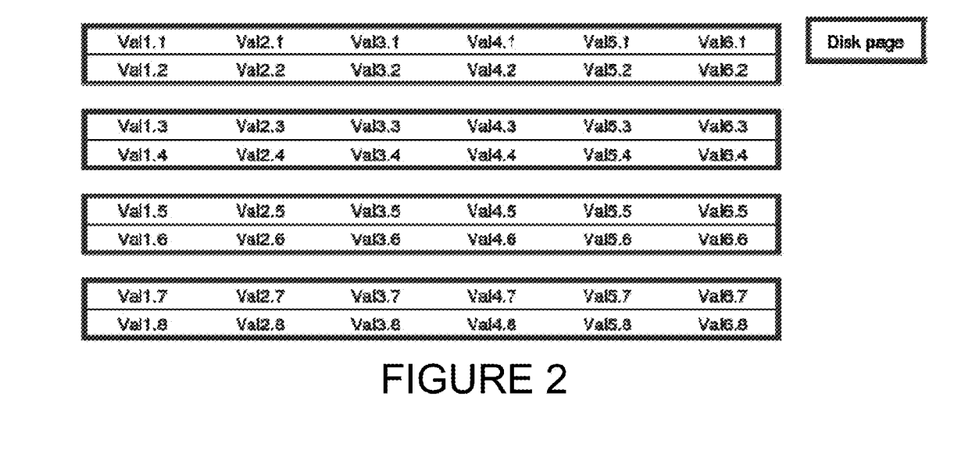
FIG. 2 illustrates table storage in an NSM system.

There are multiple ways to store a given logical table structure in a physical storage. The most popular way is "N-ary Storage Model" (NSM, also called "row-stores") presented in FIG. 2. In this model, all attributes of a given record are stored together on disk. Multiple such records form a disk "page".

Figure 3:
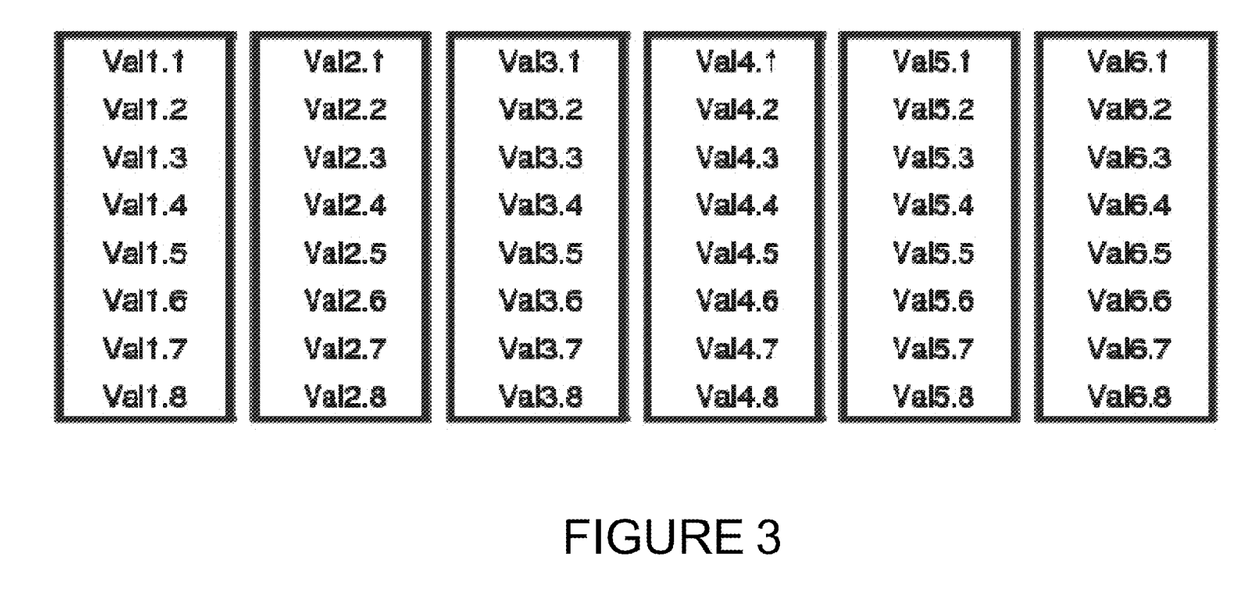
FIG. 3 illustrates table storage in a DSM system.

As an example of the different storage, some database systems use column stores (aka Decomposed Storage Model (DSM) as shown in FIG. 3) that have different input/output ("IO") and memory characteristics than traditional row-stores. On one hand, storing data in columns results in reduced IO volume (only relevant columns are fetched) and columnar storage results in increased potential of data compression, as values from the same domain are stored together. At the same time, fetching multiple attributes from disk can result in an increased number of IO requests. In addition, when performing multiple requests to read the attributes from the same table, multiple blocks need to be cached in memory at the same time, significantly increasing pressure on buffer pool. This is especially true since column databases typically use large block (disk-page) sizes. In extreme cases, this can lead to inability of the system to process a query within a given memory constraint. Finally, if there are relatively few records in a given table, allocating a disk block for each column separately can lead to significant waste of disk space and buffer memory.

Figure 4:
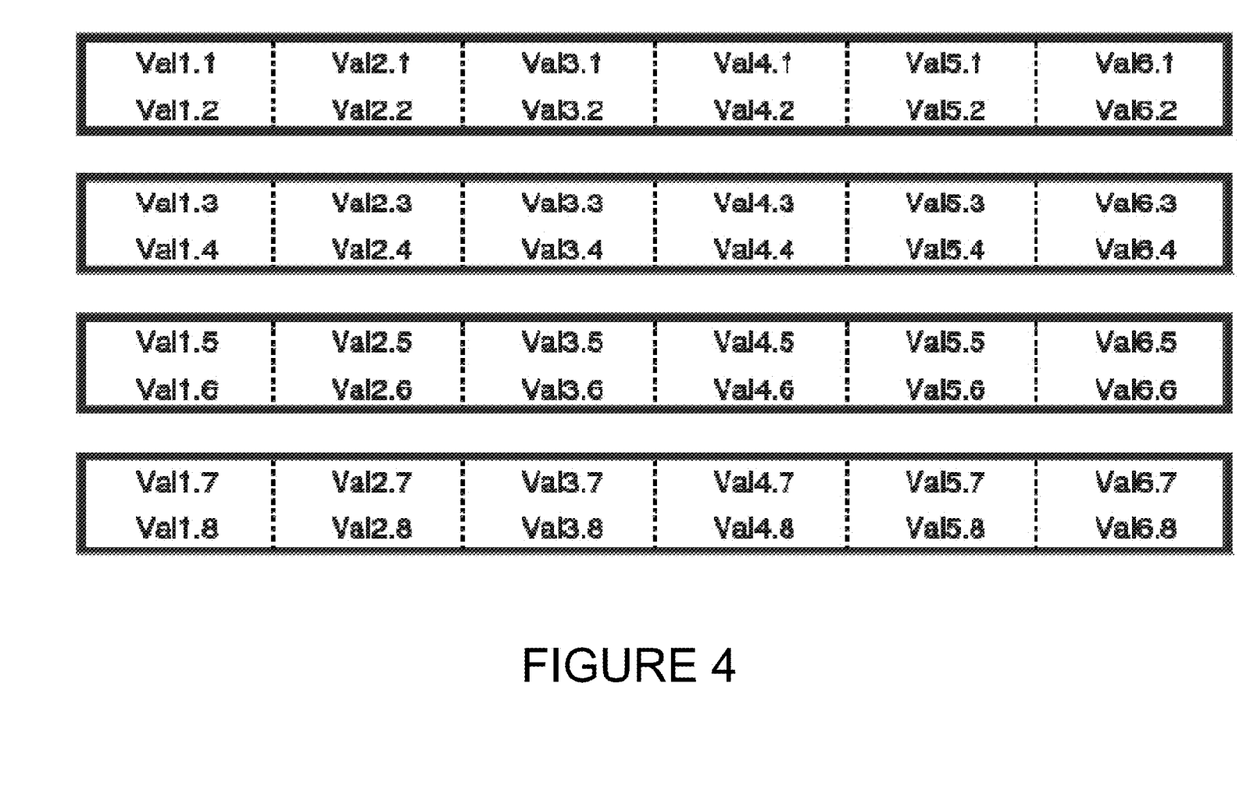
FIG. 4 illustrates table storage in a standard PAX system.

Some database system use PAX storage as shown in FIG. 4. The PAX storage was proposed in an article by Ailamaki et al. entitled "Weaving Relations for Cache Performance", Proceedings of the 27th Very Large Data Bases ("VLDB") Conference, Roma, Italy (2002), pp, 1-12, which is incorporated herein by reference. The PAX storage allows the storage of multiple attributes in a single disk block, like in NSM system in FIG. 2, but in each block data is stored in columns, like in DSM.

Vectorwise uses a generalized PAX concept allowing each table to consist of multiple PaxGroups, where each PaxGroup is a subset of table attributes stored together using the PAX storage. Different approaches for dividing a table into PaxGroup are possible, for example: many groups each storing just one attribute (Vectorwise default, explicit when used with the WITH STRUCTURE=VECTORWISE clause on CREATE TABLE statement, property-wise equivalent to DSM) or one group with all attributes (when used with WITH STRUCTURE=VECTORWISE_ROW, IO-wise equivalent to NSM). This can lead to problems described above.

In summary, the main problems are: 1) in DSM, with very many scanned columns, very many IOs need to be performed; 2) in DSM, with very many scanned columns, many blocks need to be cached in memory at the same time to allow tuple reconstruction; 3) in DSM, tables with few records can waste significant disk and buffer space due to allocating a block per each attribute; 4) in NSM/PAX, with very many or very wide columns, only a few tuples will fit in a single disk block that reduces the opportunity for data compression; and 5) in NSM/PAX, with very many or very wide columns it might be that a single tuple won't even fit in a block. Note that solving all these problems at the same time is impossible assuming non-duplicated data storage, as optimizing for problems 1-3 leads to a full NSM storage, while optimizing for problems 4-5 leads to a full DSM storage.

Automatic DSM storage (aka AutoDSM or AutoPAX) attempts to balance the above problems by avoiding situations where problems might occur, and at the same time trying to assure that benefits of column stores are maintained.

There are also some databases that provide ways to partition table attributes into sub-groups. One example is a manual vertical partitioning, such as was proposed by Vertica with its Flexstore technology that is described at http://www.vertica.com/2010/08/18/vertica-flash-runaway-performance-at-a-low-price/ which is incorporated herein by reference. This can be used to manually partition tables into something that AutoDSM would produce. But since it's an arbitrary mechanism, it allows anything one imagines. An extra benefit here is that it allows putting some attributes on faster devices (e.g., solid-state drives) and some on slower (e.g. standard HDDs).

Some other solutions propose automatic vertical fragmentation based on looking at the query load, such as those disclosed in the Hankins et al. article entitled "Data Morphing: An Adaptive, Cache-Conscious Storage Technique, Proceedings of the 29th VLDB Conference, Berlin, Germany (2003), pp. 1-12, which is incorporated herein by reference, and an article by Grund et al., "HYRISE—A Main Memory Hybrid Storage Engine", VLDB '10 in Singapore (2010), pp. 1-12, which is incorporated herein by reference. The goals of such algorithms are to put columns accessed together close to each other. While the above techniques are useful, they are mostly targeted at optimizing performance. AutoDSM addresses a different goal: reducing resources, improving compression rates and actually allowing very wide tables to be used. It also is not clear how well the automatic vertical fragmentation algorithms would handle 100s or 1000s of columns.

The automatic vertical partitioning of the data morphing article and the HYRISE article can provide much better results than other systems, but require a'priori knowledge of queries and it is unclear if these systems are meant to work for schemas with 1000+ columns. There may also be manual partitioning that is possible but it is fraught with human error and very slow.

Thus, it is desirable to provide a system and method for improving input/output and memory utilization in a database that overcomes the limitations of the above techniques and systems and it is to this end that the disclosure is directed.

DETAILED DESCRIPTION OF ONE OR MORE EMBODIMENTS

The disclosure is particularly applicable to a database system that is implemented as illustrated and described below and it is in this context that the disclosure will be described. It will be appreciated, however, that the system and method has greater utility since it can be implemented using various computer architectures and the system and method are not limited to any particular computer architecture. Furthermore, the method for automatic vertical table decomposition can be used in any database system in which it is desirable to be able to improve input/output and memory utilization in a database.

Figure 6:
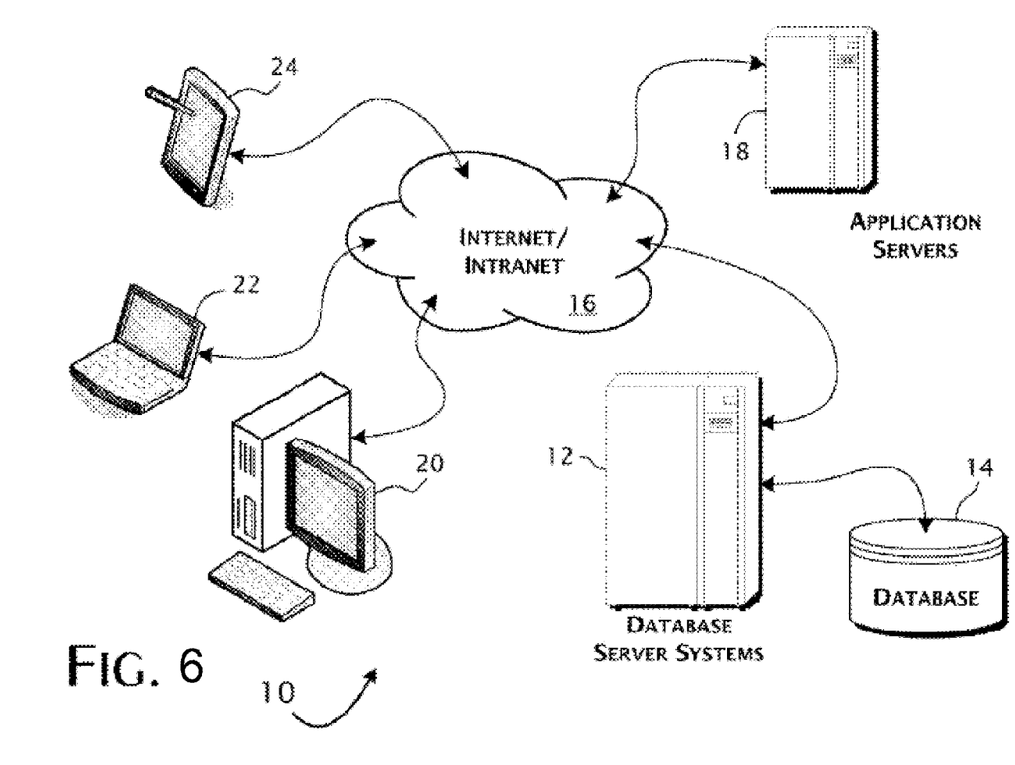
FIG. 6 is a system diagram illustrating an implementation of an operating environment of a database system.

FIG. 6 is a system diagram illustrating an implementation of an operating environment 10 of a database system. In the environment, one or more database server systems 12 host, directly or indirectly, a storage device 14, such as for example a database. Access requests are typically received over a wired or wireless link 16, such as for example, the Internet and intranet or other networks, from various sources such as for example one or more application servers 18 that are each executing e.g. on-line transaction processing (OLTP) applications or on-line analytical processing (OLAP) application. The specific operations of the applications are typically directed by or executed in support of requests from one or more computing units, such as for example, client applications executed on client computers 20 of various types including mobile computers 22 and communications devices 24. Each computing unit may be a processing unit based device with sufficient processing power, memory and connectivity to interact with the database server system 12. For example, each computing device may be a smartphone (Apple iPhone, RIM Blackberry, Android based devices), a personal computer, a tablet computer and the like.

Figure 7:
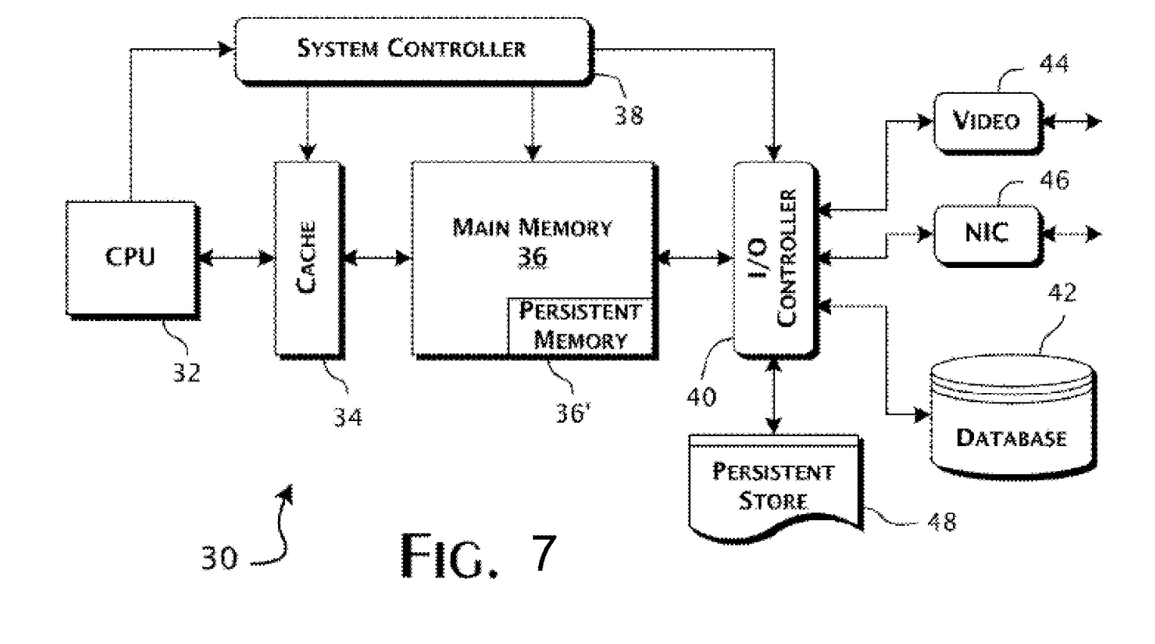
FIG. 7 is a simplified block diagram of an implementation of a computer database system that may implement the automatic vertical decomposition of a table process.

FIG. 7 is a simplified block diagram of an implementation of a computer database system 30 for the database system 12 that may implement the automatic vertical table decomposition process. The database system 30 may include one or more central processing unit (CPU) subsystem 32, implemented for example as a multi-core, multiprocessor subsystem, includes some combination of in-core and close coupled cache subsystem 34 connected to a main memory store 36. In typical embodiments, the cache subsystem 34 will range from 2 to 32 megabytes per core with typically additional, larger cache layers shared among the cores within the CPU subsystem 32 and the main memory 36 will be substantially larger. A portion 36' of the main memory store 36 may be implemented to be persistent memory so that the data is maintained even when power is removed, such as by using Flash memory or a conventional backup battery solution. A system controller 38 manages data transfers between the central processing subsystem 32, cache 34, and main memory 36 subsystems through one or more input/output (I/O) controllers 40 that connect, directly or indirectly, to a physical database 42, and I/O devices, including typically a video controller 44 and network interface controller 46. A high-access rate persistent store 48, utilizing a high-performance magnetic or Flash emulation disk, may also be provided.

Figure 8:
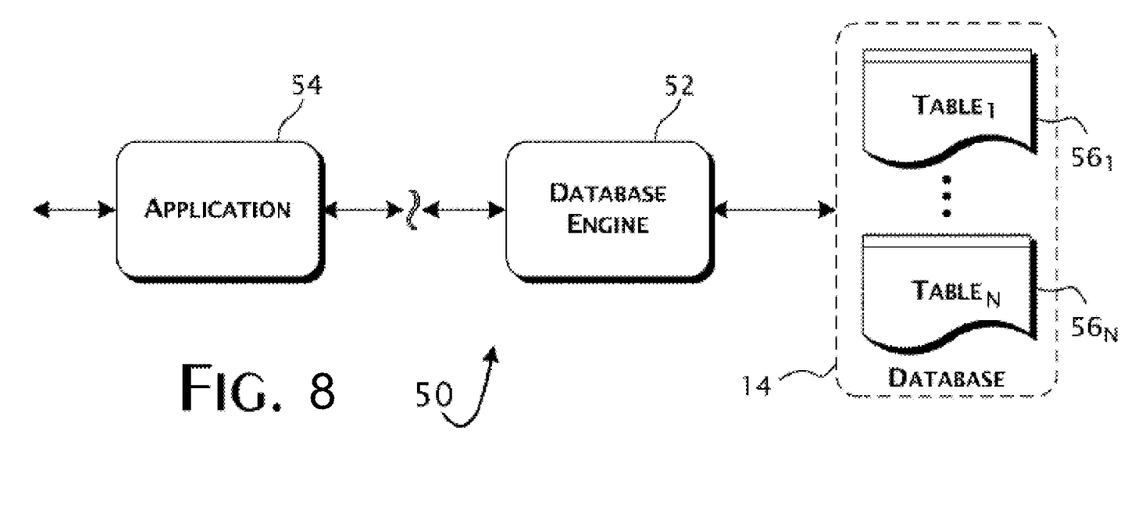
FIG. 8 is a block diagram illustrating a preferred tiered implementation of the database system.

FIG. 8 is a block diagram illustrating a preferred tiered implementation of the database system execution environment 50 that is implemented in or as part of a database engine 52. Database read and update requests are received from one or more applications 54 and satisfied by access to a database 14 containing one or more data tables, such as $56_1, \ldots, 56_N$ as shown in FIG. 8. The one or more applications 54 may be executed local or remote with respect to the database engine 52. The database 14 may be implemented as a physical storage device 42 connected directly to a database server system 12 that executes the database engine 52 or remotely through storage area network (SAN) or other distributed data storage system. The database engine, in one embodiment, may include a table decomposition unit that implements the automatic vertical table decomposition process described below.

The automatic vertical table decomposition system and method may be implemented on the system described above. In the automatic vertical table decomposition system and method, the table is a well known SQL table and a column is an SQL column. A PaxGroup is a single element of vertical decomposition of a table. For DSM storage, by default, there are as many PaxGroups as columns with 1 column each and, for NSM storage, by default, there is 1 PaxGroup with all the columns. In the description below, a disk page is on the disk allocation unit. With PAX storage, it stores multiple records from a single PaxGroup in one block that means that it can store values for a single column from very many records, or values for more columns but from fewer records. In Vectorwise, when a table is created, it automatically attempts to use the "auto-pax" approach.

The automatic vertical table decomposition system and method uses the following variables/flags as part of the method:

cbm/max_num_columns_per_pax_group (64 by default)—maximum allowed number of columns of a single PaxGroup cbm/max_sum_column_width_per_pax_group (256K by default)—maximum allowed sum of column width in a single PaxGroup cbm/max_num_pax_groups (0 by default, meaning: auto-calculated) maximum allowed number of PaxGroups in a table. The default is calculated as e.g. a fraction (¼ by default) of total number of blocks in the buffer pool. Now, the automatic vertical table decomposition method is described in more detail.

Figure 9:
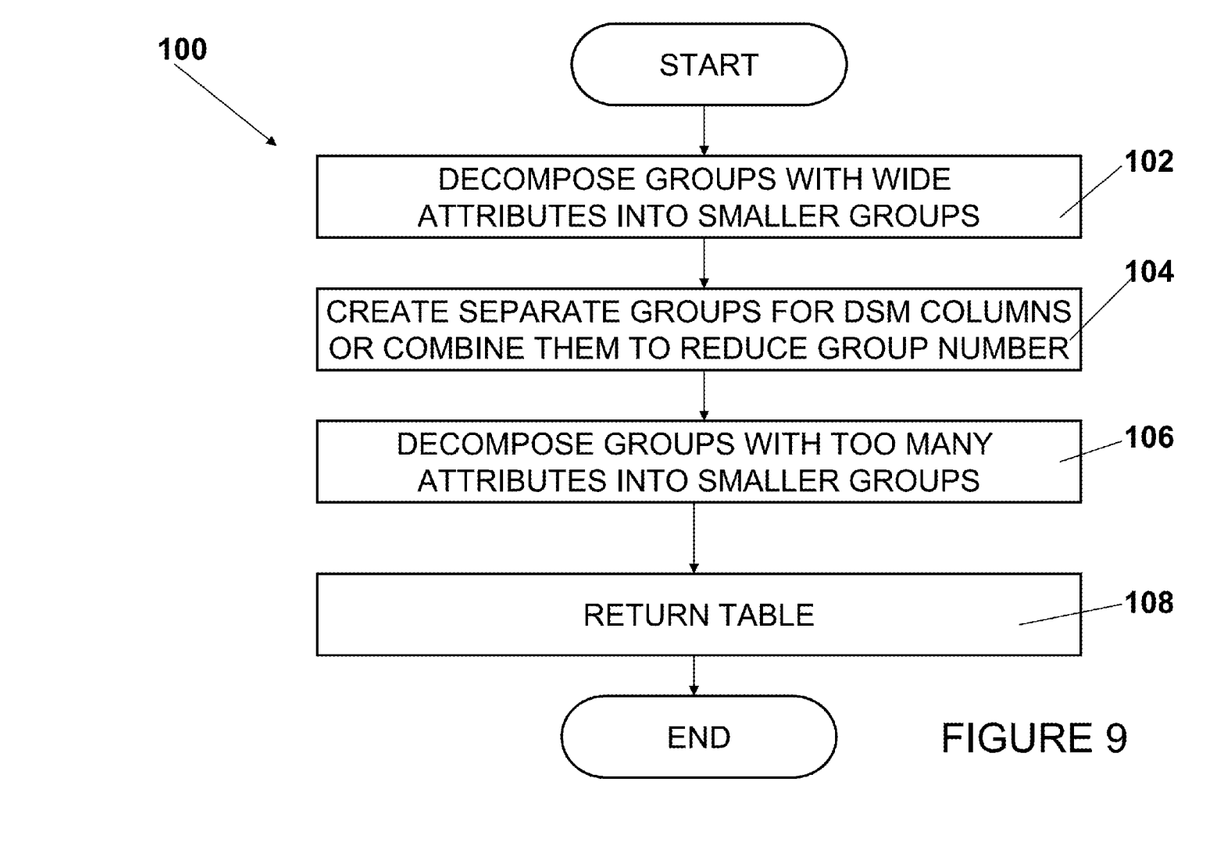
FIG. 9 illustrates a method for automatic vertical decomposition of a table that may be implemented by the system illustrated in FIGS. 6-8.

FIG. 9 illustrates a method 100 for automatic vertical table decomposition that may be implemented by the system illustrated in FIGS. 6-8. In the method, that may be implemented by the database system described above, a table may be processed. An example of the method in pseudocode is attached as Appendix A and is incorporated herein by reference. In a first process (102), the method, for very wide PaxGroups, decomposes the groups into smaller groups, such as by splitting the groups by column width. Once the group has been decomposed into smaller groups, the method, if there are fewer groups than possible (based on the max_num_pax_groups variable discussed above), then the method (104) creates separate groups for DSM columns in the input. Then, the method (106), if there are still fewer groups than possible (based on the max_num_pax_groups variable discussed above), the method determines if the method can split some of the wide PAX (not-DSM) groups. When these processes are completed, the method is completed and a decomposed table structure (108) is returned.

The method may determine when to do one of: 1) decomposing the table that has a high number of attributes into a plurality of smaller groups; 2) combining groups to reduce the number of groups; and 3) splitting the PaxGroup based on either a user controlled criteria or a predetermined criteria. The user controlled criteria means that the user can adjust how/when each of the different operations in the method occur. The predetermined criteria, for example, may be a maximum number of physical groups per table, a maximum width of attributes in a single group or a maximum number of attributes in a single group. The predetermined criteria also may be provided by the user to the system or dynamically determined based on an application environment of the database engine (the size of the memory of the system, the processing power of the system hosting the database engine, for example.) In the method, the maximum number of physical groups per table may be determined, for example, based on available memory of a computer executing the database engine. The maximum number of physical groups per table and/or the maximum width of attributes in a single group may be determined, for example, based on parameters of an input/output system and the parameters may be, for example, a block size or an input/output speed of the system. The predetermined criteria also may be an expected number of records in the table. Based on the above criteria, the method may also create one or more many-column groups for tables with a small number of records or create multiple few-column or single-column groups for tables with a large number of records.

Figure 5:
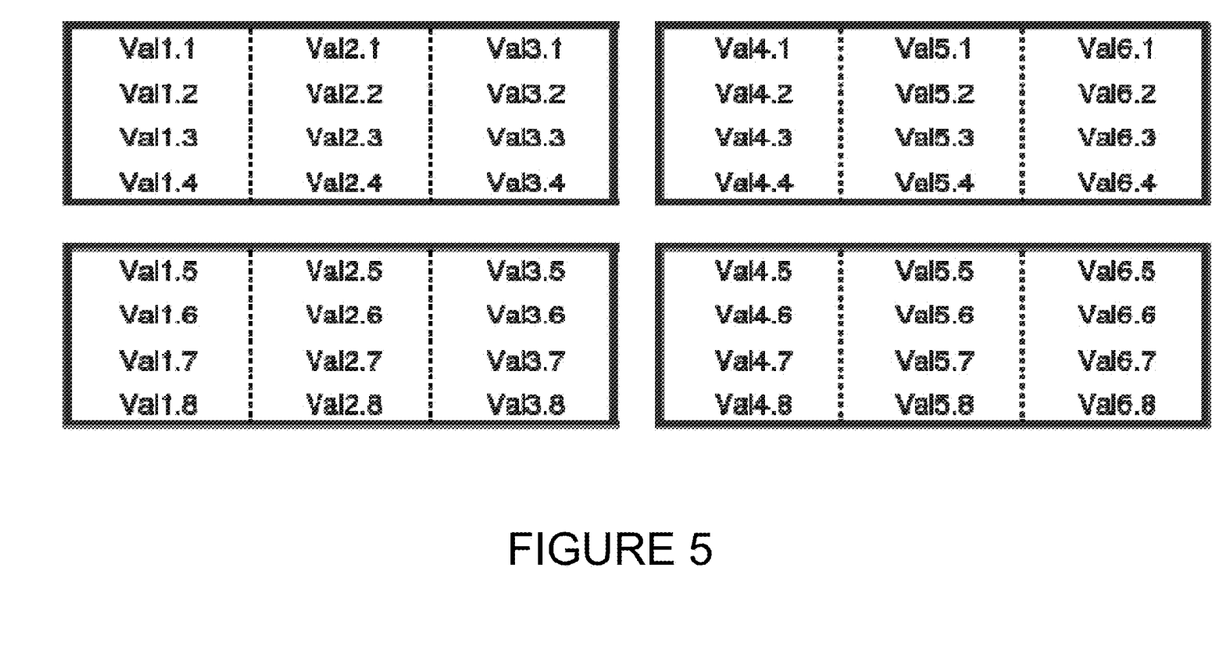
FIG. 5 illustrates table storage in an automatic PAX system.

An example comparing the above method to the typical methods described above is now provided. Assuming that there is a 6-column table with 8 records (hence 48 different values) and a disk page can hold 12 values. With the NSM storage (shown in FIG. 2), 4 pages are needed, each holding 2 records of 6 values. With the DSM storage (shown in FIG. 3), 6 pages are needed, each holding 8 values. With PAX storage (shown in FIG. 4), like in NSM, 4 pages are needed, each holding 6 PAX column, each holding 2 values. In the AutoPAX approach using the above vertical table decomposition (assuming max_num_columns_per_pax_group=3), 4 pages are needed, each holding 3 PAX columns, each holding 4 values such as is shown in FIG. 5.

The above example is simplified for demonstration purposes. A similar, but more realistic example would be an NSM table with 5000 records, 10000 attributes, each attribute consuming 4 bytes (hence each record is 40,000 bytes), and a disk page of 256 KB. With NSM storage, each disk page would store only 6 records (256 KB/40,000), greatly reducing potential of per-column compression. With full DSM storage, 10,000 pages (hence 10,000*256 KB=2.56 GB on disk) would be used, each storing 5000 values, consuming only 4*5000=20000 bytes (out of allocated 256 KB). It also means that, assuming fixed-page-size buffer pool, 2.56 GB of buffer space would be needed in the phase to efficiently reconstruct full records (as all attribute pages should be in memory). With Auto-PAX, assuming max_num_columns_per_pax_group is 64, a table will be decomposed into 157 PaxGroups containing on average 64 columns. Then, each page (containing attributes from one PaxGroup) will contain 1024 tuples (as 1024 tuples*4 bytes*64 columns=256 KB), providing good compression opportunities. With that, each PaxGroup will consume 5 blocks, leading to total block consumption of 157*5=785 blocks. Additionally, for tuple reconstruction, only 157 pages (hence 39 MB) will be needed (comparing to 2.56 GB in DSM and 256 KB in NSM). Note, for simplification, all computation above assumes no compression is applied, but in reality storage of Auto-Pax would be additionally improved by compression.

In above example, Auto-PAX allows reduced disk and buffer usage (comparing to DSM) and improved compression opportunities (comparing to NSM). This happens at a cost of introducing (a reasonably small number of) additional PaxGroups. This shows how the algorithm balances different requirements and avoids extremes. By changing algorithm settings, different behaviors can be achieved (e.g. providing more NSM-like or DSM-like schemas).

As another example, when a user specifies a table with 1024 columns using VECTORWISE_ROW (NSM/PAX) storage, if max_num_columns_per_pax_group is equal to 64, instead of a single PaxGroup, the method generates 16 (1024/64) groups, each with 64 columns. As another example, when a user specified a table with 1024 columns using VECTORWISE (DSM) storage, if max_num_pax_groups is 64, there will be 64 groups created, each with 16 columns.

The method may also have additional logic controlling very wide parameters so that if there are wide columns, the method won't allow too many of them in a single group. This allows storing more records in a disk block, increasing compression opportunities. For example, imagine a table with 64 attributes, each declared as VARCHAR(16000), meaning that each value in each attribute can contain up to 16,000 characters, meaning each such value can take up to around 16,000 characters when physically stored. In reality, most such columns use significantly less storage as it is rare for the values to consume all available space (e.g. the field "STREET" can be declared as VARCHAR(100) but most street names are significantly shorter). Still, if all values for a given record are "full", a single disk block of e.g. 512 KB wouldn't be able to even store a single record. With AutoDSM, observing the cbm/max_sum_column_width_per_pax_group (256 KB by default) the table would be decomposed into 4 PaxGroups, each with 16 columns (as 16*16000 fits in 256 KB). The result is that values for at least two records will fit in each block. As discussed above, with "not-full" data, it is expected that significantly more records will fit in a single block.

While the above described vertical partitioning may provide better performance, they require a'priori knowledge of queries and are not meant for schemas with 1000+ columns. The method described above is a very important problem in cases with very many columns and little buffer memory.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A database system, comprising:
   a store having a plurality of tables; wherein each table has a plurality of wide attributes and the plurality of attributes are partitioned into one or more groups for physical storage;
   a computer having a database engine connected to the store that manipulates the tables; and
   the database engine having a table decomposition unit that automatically decomposes the table having a schema into a plurality of smaller groups having the same schema for storage in the store by splitting the table by column width based on a maximum number of columns in each group into the plurality of smaller groups, creating separate groups for DSM columns in the table if a maximum number of groups is not exceeded by the splitting the table by column width and further splitting one or more of the smaller groups by column width if the maximum number of groups is not exceeded by the creation of the separate groups for DSM columns and returning a decomposed table structure to the store.

2. The system of claim 1, wherein the table decomposition unit decomposes the table that has a high number of attributes into a plurality of smaller groups.

3. The system of claim 2, wherein the table decomposition unit combines groups to reduce the number of groups.

4. The system of claim 3, wherein table decomposition unit combines groups when a number of groups is more than a maximum number of groups.

5. The system of claim 3, wherein the table decomposition unit splits the PaxGroup.

6. The system of claim 5, wherein the table decomposition unit splits the PaxGroup when a number of one or more separate groups and one or more smaller groups is less than a maximum number of PaxGroups.

7. The system of claim 1, wherein the table decomposition unit performs one of decomposes the table that has a high number of attributes into a plurality of smaller groups, combines groups to reduce the number of groups and splits the PaxGroup based on one of a user controlled criteria and a predetermined criteria.

8. The system of claim 7, wherein the predetermined criteria is one of a maximum number of physical groups per table, a maximum width of attributes in a single group and a maximum number of attributes in a single group.

9. The system of claim 8, wherein the maximum number of physical groups per table is determined based on available memory of a computer executing the database engine.

10. The system of claim 8, wherein one of the maximum number of physical groups per table and the maximum width of attributes in a single group is determined based on parameters of an input/output system.

11. The system of claim 10, wherein the parameters of an input/output system are one of a block size and an input/output speed.

12. The system of claim 7, wherein the predetermined criteria is provided by the user.

13. The system of claim 7, wherein the predetermined criteria is dynamically determined based on an application environment.

14. The system of claim 7, wherein the predetermined criteria is an expected number of records in the table.

15. The system of claim 14, wherein the table decomposition unit creates one or more many-column groups for tables with a small number of records.

16. The system of claim 14, wherein the table decomposition unit creates multiple few-column or single-column groups for tables with a large number of records.

17. A method for managing a database using a computer implemented database system that has a store having a plurality of tables and a database engine connected to the store that manipulates the tables, the method comprising:
    automatically decomposing, on a computer implemented database system, a table having a schema with a plurality of wide attributes into a plurality of smaller groups having the same schema for the storage in the store by splitting the table by column width based on a maximum number of columns in each group into the plurality of smaller groups;
    creating separate groups for DSM columns in the table if a maximum number of groups is not exceeded by the splitting the table by column width;
    splitting one or more of the smaller groups by column width if the maximum number of groups is not exceeded by the creation of the separate groups for DSM columns; and
    providing the decomposed table structure to the store.

18. The method of claim 17, wherein automatically decomposing the table further comprises decomposing the table that has a high number of attributes into a plurality of smaller groups.

19. The method of claim 18 further comprising combining groups to reduce the number of groups.

20. The method of claim 19, wherein combining groups is done when a number of groups is more than a maximum number of groups.

21. The method of claim 19 further comprising splitting a PaxGroup.

22. The method of claim 21, wherein splitting the PaxGroup occurs when a number of one or more separate groups and one or more smaller groups is less than a maximum number of PaxGroups.

23. The method of claim 17, wherein automatic decomposing further comprises one of decomposing the table that has a high number of attributes into a plurality of smaller groups, combining groups to reduce the number of groups and splitting the PaxGroup based on one of a user controlled criteria and a predetermined criteria.

24. The method of claim 23, wherein the predetermined criteria is one of a maximum number of physical groups per table, a maximum width of attributes in a single group and a maximum number of attributes in a single group.

25. The method of claim 24 further comprising determining the maximum number of physical groups per table based on available memory of a computer executing the database engine.

26. The method of claim 24 further comprising determining one of the maximum number of physical groups per table and the maximum width of attributes in a single group based on parameters of an input/output system.

27. The method of claim 26, wherein the parameters of an input/output system are one of a block size and an input/output speed.

28. The method of claim 23, wherein the predetermined criteria is provided by the user.

29. The method of claim 23 further comprising dynamically determining the predetermined criteria based on an application environment.

30. The method of claim 23, wherein the predetermined criteria is an expected number of records in the table.

31. The method of claim 30 further comprising creating one or more many-column groups for tables with a small number of records.

32. The method of claim 30 further comprising creating multiple few-column or single-column groups for tables with a large number of records.

* * * * *